US011886005B2

(12) United States Patent
Sakamoto et al.

(10) Patent No.: US 11,886,005 B2
(45) Date of Patent: Jan. 30, 2024

(54) OPTICAL MULTIPLEXING CIRCUIT AND LIGHT SOURCE

(71) Applicant: Nippon Telegraph and Telephone Corporation, Tokyo (JP)

(72) Inventors: Junji Sakamoto, Musashino (JP); Toshikazu Hashimoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/614,668

(22) PCT Filed: May 30, 2019

(86) PCT No.: PCT/JP2019/021628
§ 371 (c)(1),
(2) Date: Nov. 29, 2021

(87) PCT Pub. No.: WO2020/240796
PCT Pub. Date: Dec. 3, 2020

(65) Prior Publication Data
US 2022/0221649 A1 Jul. 14, 2022

(51) Int. Cl.
*G02B 6/12* (2006.01)
*G02B 6/293* (2006.01)
(Continued)

(52) U.S. Cl.
CPC ..... *G02B 6/12019* (2013.01); *G02B 6/12007* (2013.01); *G02B 6/12014* (2013.01);
(Continued)

(58) Field of Classification Search
CPC ............ G02B 6/12007; G02B 6/12014; G02B 6/12019; G02B 6/2821; G02B 6/2938; G02B 6/29385; G02B 6/3546
See application file for complete search history.

(56) References Cited

U.S. PATENT DOCUMENTS 6,332,055 B1 * 12/2001 Hatayama ............... G02F 1/225
385/39
6,768,827 B2 * 7/2004 Yoo ......................... G02B 6/122
398/43
(Continued)

OTHER PUBLICATIONS

Akira Nakao et al., *Integrated Waveguide-Type Red-Green-Blue Beam Combiners for Compact Projection-Type Displays*, Optics Communications, vol. 330, 2014, pp. 45-48.
(Continued)

*Primary Examiner* — Ryan A Lepisto
(74) *Attorney, Agent, or Firm* — Workman Nydegger

(57) ABSTRACT

To provide an optical multiplexing circuit that can accurately monitor light of a plurality of wavelengths, and that can tolerate degradation of LDs. An optical multiplexing circuit includes m sets of multiplexers configured to multiplex light output from n connection waveguides being a plurality of connection waveguides wherein a multiplexing unit configured to input and multiplex light output from the m sets of the multiplexers from m input waveguides, an output waveguide configured to output light multiplexed by the multiplexing unit, and n×m or m branching units being inserted into n×m connection waveguides of the plurality of connection waveguides or the m input waveguides are provided on a same substrate.

5 Claims, 9 Drawing Sheets

(51) Int. Cl.
  *G02B 6/28* (2006.01)
  *G02B 6/35* (2006.01)
(52) U.S. Cl.
  CPC ....... *G02B 6/2938* (2013.01); *G02B 6/29385* (2013.01); *G02B 6/2821* (2013.01); *G02B 6/3546* (2013.01)

(56) References Cited

U.S. PATENT DOCUMENTS

| | | | |
|---|---|---|---|
| 7,257,283 B1 * | 8/2007 | Liu | G02B 6/12004 |
| | | | 385/24 |
| 10,509,166 B2 * | 12/2019 | Sugiyama | H01S 5/0608 |
| 2018/0128979 A1 * | 5/2018 | Heanue | G02B 6/12026 |
| 2019/0372664 A1 * | 12/2019 | Sugiyama | G02B 6/12007 |

OTHER PUBLICATIONS

Yoshinori Hibino, *An Array of Photonic Filtering Advantages: Arrayed-Waveguide-Grating Multi / Demultiplexers for Photonic Networks*, IEEE Circuits and Devices, Nov. 2000, pp. 21-27.

Akira Himeno et al., *Silica-Based Planar Lightwave Circuits*, IEEE Journal of Selected Topics in Quantum Electronics, vol. 4, No. 6, 1998, pp. 913-924.

J. Sakamoto et al., *High-Efficiency Multiple-Light-Source Red-Green-Blue Power Combiner with Optical Waveguide Mode Coupling Technique*, SPIE OPTO, 2017, vol. 10126, 2017, pp. 1-8.

* cited by examiner

OPTICAL MULTIPLEXING CIRCUIT AND LIGHT SOURCE

TECHNICAL FIELD

The present invention relates to an optical multiplexing circuit and a light source, and more particularly to an optical multiplexing circuit capable of multiplexing light of a plurality of wavelengths such as three primary colors of light and monitoring the intensity of light of each wavelength, and a light source including the optical multiplexing circuit.

BACKGROUND ART

In recent years, a small light source including laser diodes (LDs) that output light of three primary colors of red light (R), green light (G), and blue light (B) as a light source to be applied to a glasses-type terminal and a small pico projector has been developed. Since LDs have a higher directionality than LEDs, a focus-free projector can be realized. Further, since LDs have a high light emission efficiency and a low power consumption, and also a high color reproducibility, LDs have recently been attracting attention.

FIG. 1 illustrates a typical light source of a projector using LDs. The light source for the projector includes LDs 1 to 3 that output light of a single wavelength of respective colors of R, G, and B, lenses 4 to 6 that collimate the light output from the LDs 1 to 3, and dichroic mirrors 10 to 12 that multiplex the respective light and output the light to a MEMS mirror 16. RGB light combined into a single beam is swept by using the MEMS mirror 16 or the like and is synchronized with modulation of the LDs, and thus an image is projected onto a screen 17. Half mirrors 7 to 9 are respectively inserted between the lenses 4 to 6 and the dichroic mirrors 10 to 12, and white balance is adjusted by monitoring the divided light of each color by using photodiodes (PDs) 13 to 15.

In general, an LD emits light in a longitudinal direction of a resonator; however, because the accuracy when monitoring the rear side is poor, it is common to monitor the front side from which light is emitted (front monitoring). As illustrated in FIG. 1, for use as an RGB light source, bulk optical components such as the LDs 1 to 3, the lenses 4 to 6, the half mirrors 7 to 9, and the dichroic mirrors 10 to 12 need to be combined with a spatial optical system. Furthermore, for monitoring for an adjustment of white balance, since bulk components such as the half mirrors 7 to 9 and the PDs 13 to 15 are needed and the optical system increases in size, there is a problem in that a reduction in the size of the light source is hindered.

On the other hand, an RGB coupler using a planar lightwave circuit (PLC) instead of a spatial optical system with bulk components has been attracting attention (for example, see Non Patent Literature 1). In a PLC, an optical waveguide is produced on a planar substrate such as Si by patterning by photolithography or the like, and reactive ion etching, and a plurality of basic optical circuits (for example, a directional coupler, a Mach-Zehnder interferometer, and the like) are combined, and thus various functions can be realized (for example, see Non Patent Literatures 2 and 3).

FIG. 2 illustrates a basic structure of an RGB coupler using a PLC. An RGB coupler module including LDs 21 to 23 of respective colors of G, B, and R and a PLC-type RGB coupler 20 is illustrated. The RGB coupler 20 includes first to third waveguides 31 to 33 and first and second multiplexers 34 and 35 that multiplex light from two waveguides into a single waveguide. As methods using a multiplexer in an RGB coupler module, there are a method of using symmetrical directional couplers having the same waveguide width, a method of using a Mach-Zehnder interferometer (for example, see Non Patent Literature 1), and a method of using a mode coupler (for example, see Non Patent Literature 4), and the like.

By using a PLC, a spatial optical system using a lens, a dichroic mirror, or the like can be integrated on one chip. Further, since the LD of R and the LD of G have a weaker output than that of the LD of B, an RRGGB light source in which two LDs of R and two LDs of G are prepared is used. As described in Non Patent Literature 2, by using mode multiplexing, light of the same wavelength can be multiplexed in different modes, and an RRGGB coupler can also be easily realized by using a PLC.

CITATION LIST

Non Patent Literature

[Non Patent Literature 1] A. Nakao, R. Morimoto, Y. Kato, Y. Kakinoki, K. Ogawa and T. Katsuyama, "Integrated Waveguide-type Red-green-blue Beam Combiners for Compact Projection-type Displays", Optics Communications 320 (2014) 45-48

[Non Patent Literature 2] Y. Hibino, "Arrayed-Waveguide-Grating Multi/Demultiplexers for Photonic Networks," IEEE CIRCUITS & DEVICES, November, 2000, pp. 21-27

[Non Patent Literature 3] A. Himeno, et al., "Silica-based Planar Lightwave Circuits," J. Sel. Top. Q. E., vol. 4, 1998, pp. 913-924

[Non Patent Literature 4] J. Sakamoto et al. "High-efficiency Multiple-light-source Red-green-blue Power Combiner with Optical Waveguide Mode Coupling Technique," Proc. of SPIE Vol. 10126 101260 M-2

SUMMARY OF THE INVENTION

Technical Problem

FIG. 3 illustrates a configuration of an RGB coupler using two directional couplers. An RGB coupler 100 using the PLC includes first to third input waveguides 101 to 103, first and second directional couplers 104 and 105, and an output waveguide 106 connected to the second input waveguide 102.

A waveguide length, a waveguide width, and a gap between the waveguides are designed such that the first directional coupler 104 couples light of $\lambda 2$ incident from the first input waveguide 101 to the second input waveguide 102, and couples light of $\lambda 1$ incident from the second input waveguide 102 to the first input waveguide 101 and back to the second input waveguide 102. A waveguide length, a waveguide width, and a gap between the waveguides are designed such that the second directional coupler 105 couples light of $\lambda 3$ incident from the third input waveguide 103 to the second input waveguide 102, and passes light of $\lambda 1$ and $\lambda 2$ coupled to the second input waveguide 102 in the first directional coupler 104.

For example, green light G (wavelength $\lambda 2$) is incident on the first input waveguide 101, blue light B (wavelength $\lambda 1$) is incident on the second input waveguide 102, red light R (wavelength $\lambda 3$) is incident on the third input waveguide 103, and the three colors of light R, G, and B are multiplexed by the first and second directional couplers 104 and 105 and output from the output waveguide 106. Light of 450 nm, light of 520 nm, and light of 638 nm are used as the wavelengths of λ1, λ2, and λ3, respectively.

Thus, the application of such an RGB coupler to configure a light source including a monitoring function for an adjustment of white balance is demanded.

On the other hand, in an optical connection between each of the LDs 21 to 23 and the RGB coupler 20 illustrated in FIG. 2, optical axes are generally aligned via a gap. However, the LDs 21 to 23 for visible light used in the light source has shorter wavelengths than LDs in communication wavelength bands, and a smaller mode field diameter. Thus, even when light output power is the same as that in the communication wavelength bands, power density is higher by one digit. Furthermore, energy from visible light to ultraviolet light is higher than energy of light in the communication wavelength bands, and thus, an emission end surface is severely degraded due to the dust collection effect of light, and life expectancy of the LD is shortened.

Thus, even with a light source with increased accuracy of monitoring, it may be out of a range for feedback control when the light source is in actual operation with degradation of LDs. Sealing the LDs and the RGB coupler can suppress such degradation, but there has been a problem in that manufacturing cost of such a light source is increased.

Means for Solving the Problem

An object of the present invention is to provide an optical multiplexing circuit including a multiplexing unit constituted by a PLC, which can accurately monitor light of a plurality of wavelengths and can tolerate degradation of LDs, and a light source including the optical multiplexing circuit.

In order to achieve such an object, an embodiment of an optical multiplexing circuit includes m sets of multiplexers configured to multiplex light output from n connection waveguides being a plurality of connection waveguides wherein a multiplexing unit configured to input and multiplex light output from the m sets of the multiplexers from m input waveguides, an output waveguide configured to output light multiplexed by the multiplexing unit, and n×m or m branching units being inserted into n×m connection waveguides of the plurality of connection waveguides or the m input waveguides are provided on a same substrate.

Effects of the Invention

According to the present invention, one laser diode of n laser diodes can be selected and operated for each m set to tolerate degradation of LDs.

DESCRIPTION OF EMBODIMENTS

Hereinafter, embodiments of the present disclosure will be described in detail with reference to the drawings. In the present embodiment, description is given for the case of a method using a directional coupler as a multiplexer, but the present invention is not limited to a multiplexing method. An RGB coupler that multiplexes wavelengths of three primary colors of light is described as an example, but it goes without saying that the present invention can be applied to optical multiplexing circuits that multiplex a plurality of other wavelengths.

First Embodiment

Figure 4:
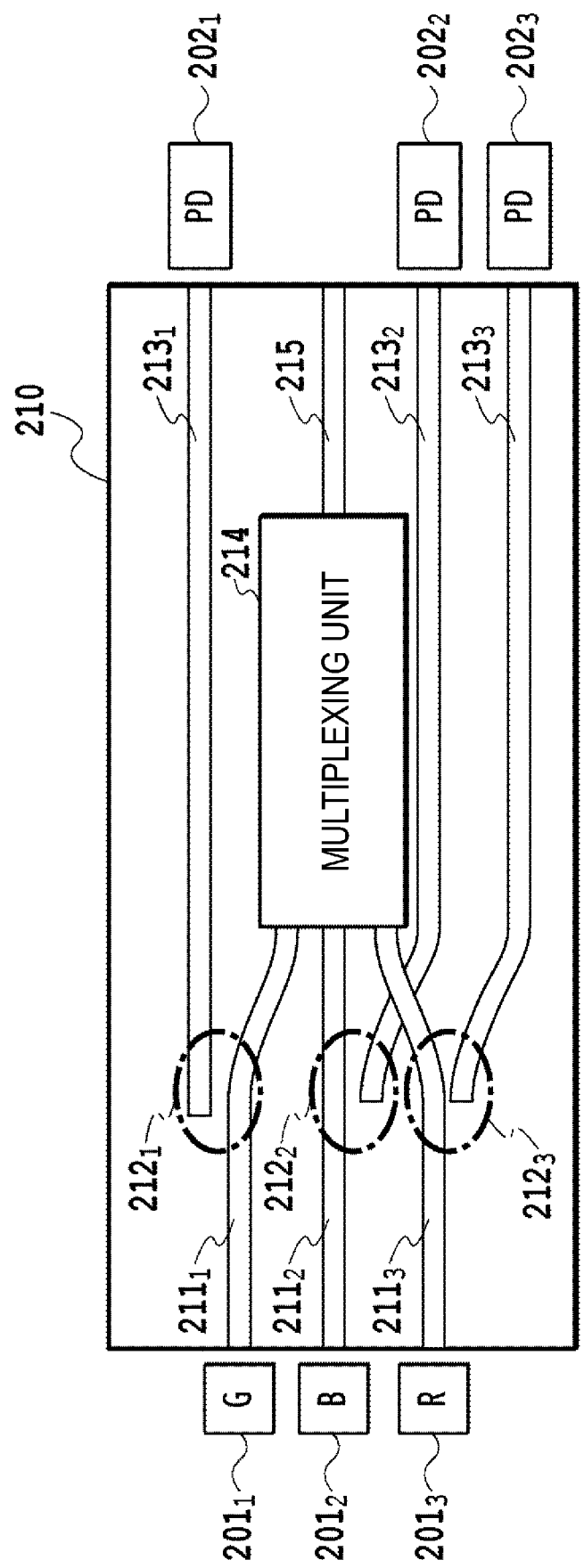
FIG. 4 is a diagram illustrating a light source with a monitoring function according to a first embodiment of the present invention.

FIG. 4 illustrates a light source with a monitoring function according to a first example of a first embodiment of the present invention. A light source with a monitoring function includes first to third LDs $201_1$ to $201_3$ that respectively output light of respective colors of R, G, and B, a PLC-type RGB coupler 210, and first to third PDs $202_1$ to $202_3$ optically connected to the RGB coupler 210.

The PLC-type RGB coupler 210 includes first to third input waveguides $211_1$ to $211_3$ optically connected to the first to third LDs $201_1$ to $201_3$, first to third branching units $212_1$ to $212_3$ that divide light propagating through the waveguide into two, a multiplexing unit 214 that multiplexes one beam of the light divided by each of the first to third branching units $212_1$ to $212_3$, first to third monitoring waveguides $213_1$ to $213_3$ that output the other beam of the light divided by each of the first to third branching units $212_1$ to $212_3$ to the first to third PDs $202_1$ to $202_3$, and an output waveguide 215 that outputs the light multiplexed by the multiplexing unit 214.

In the PLC-type RGB coupler 210, light incident on each of the first to third input waveguides $211_1$ to $211_3$ is divided into two by each of the first to third branching units $212_1$ to $212_3$. One beam of the divided light is output to the first to third PDs $202_1$ to $202_3$ via the first to third monitoring waveguides $213_1$ to $213_3$, and the other beam of the divided light is multiplexed by the multiplexing unit 214 and output to the output waveguide 215.

Figure 1:
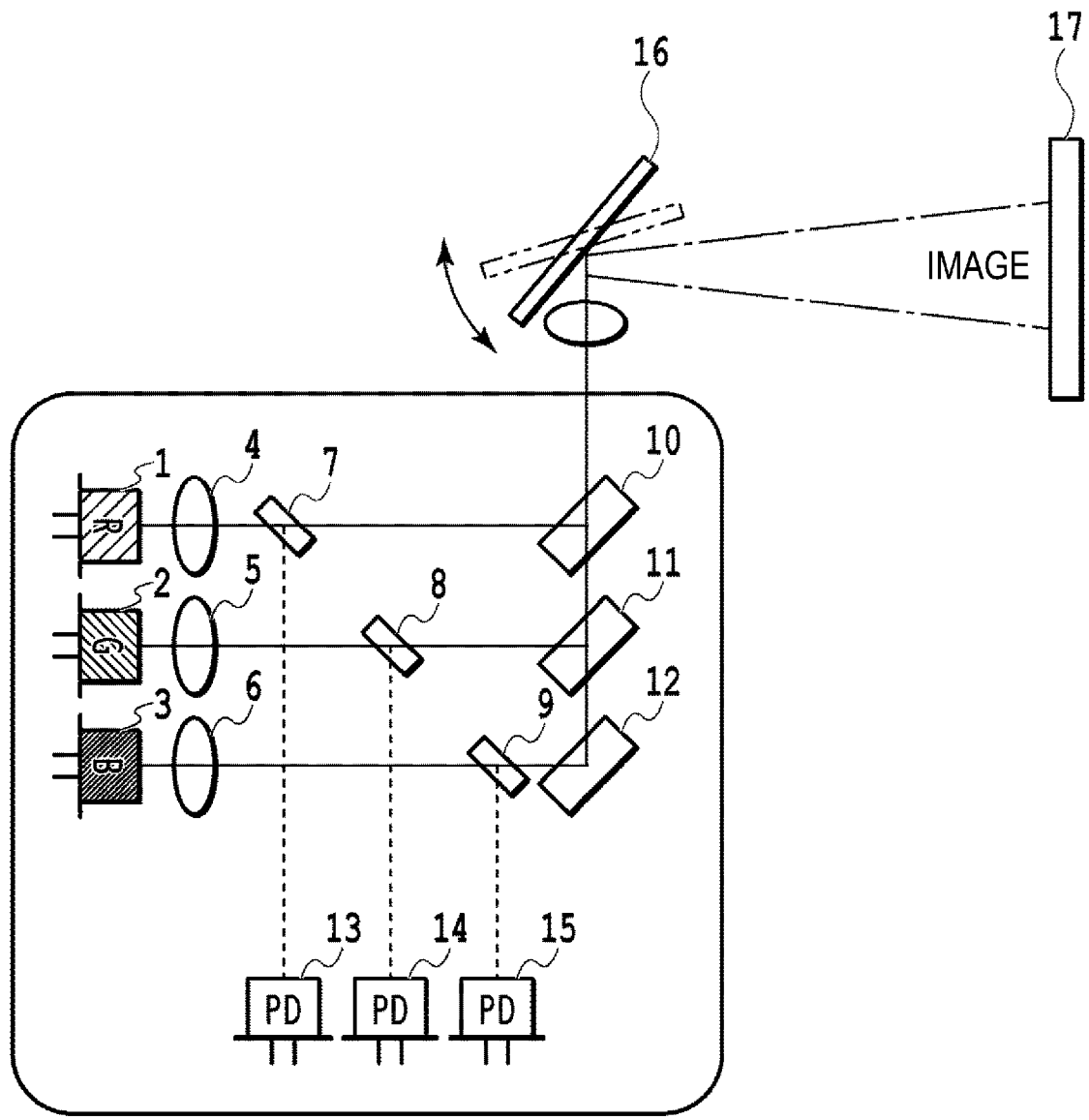
FIG. 1 is a diagram illustrating a typical light source of a projector using LDs.
Figure 2:
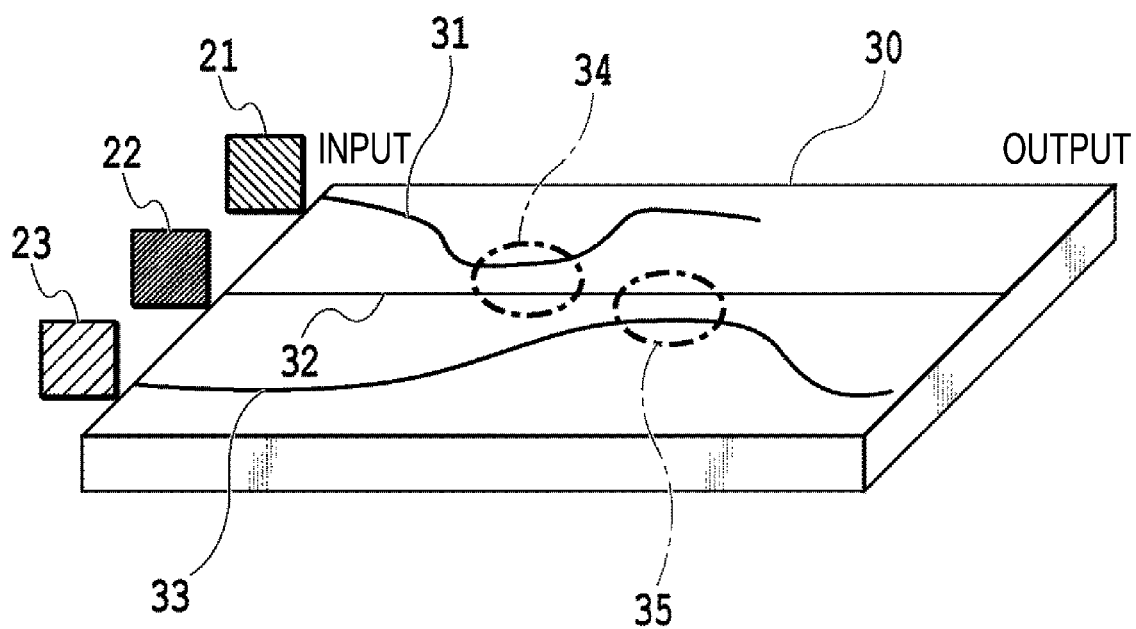
FIG. 2 is a diagram illustrating a basic structure of an RGB coupler using a PLC.
Figure 3:
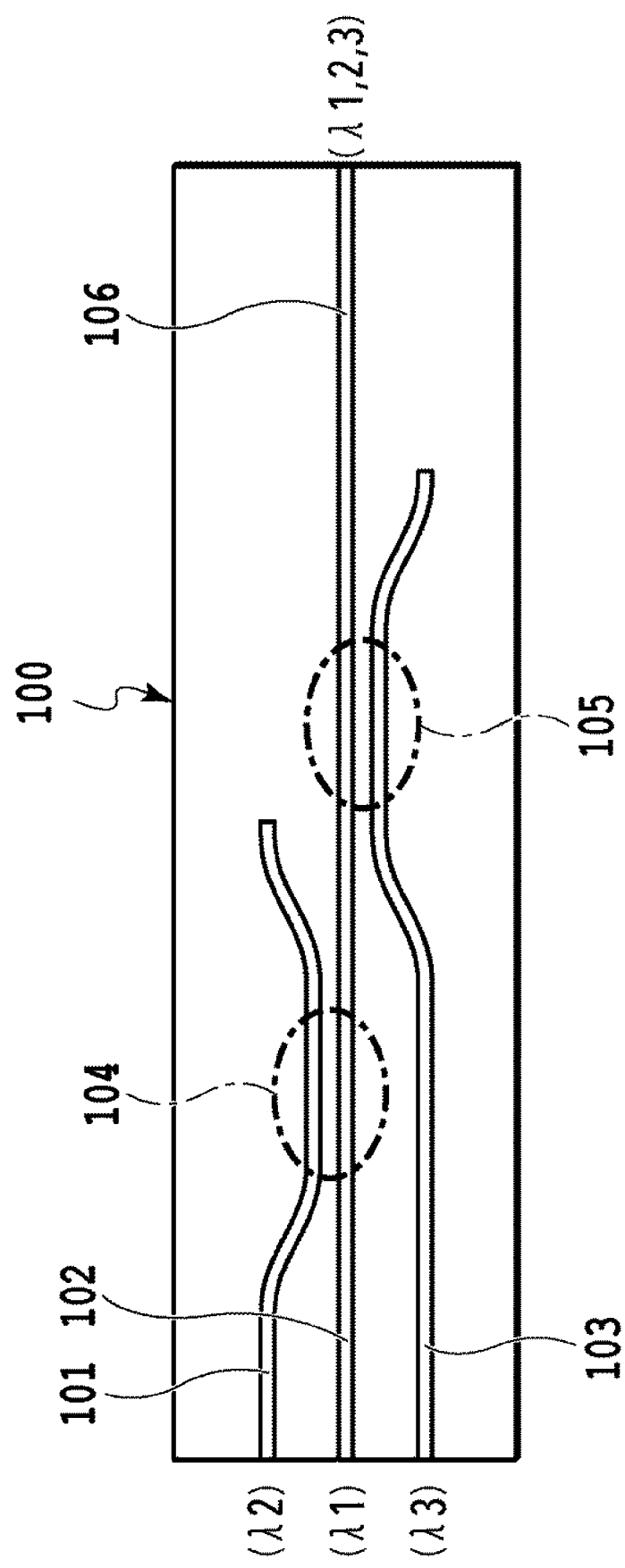
FIG. 3 is a diagram illustrating a configuration of an RGB coupler using two directional couplers.

An optical multiplexing circuit using the directional coupler illustrated in FIG. 3 can be used as the multiplexing unit 214. In this case, the first to third input waveguides $211_1$ to $211_3$ are coupled to the first to third input waveguides 101 to 103 illustrated in FIG. 3, respectively, and the output waveguide 215 is coupled to the output waveguide 106 illustrated in FIG. 3. However, the multiplexing unit 214 is not limited thereto, and another multiplexing unit of a waveguide type (for example, a Mach-Zehnder interferometer, a mode coupler, or the like) may be used.

As illustrated in FIG. 4, when light propagating through the first to third input waveguides $211_1$ to $211_3$ is divided by the first to third branching units $212_1$ to $212_3$, respectively, a coupling characteristic between the first to third LDs $201_1$ to $201_3$ and the first to third input waveguides $211_1$ to $211_3$ may be monitored. In addition, it is possible to adjust white balance as a light source by using a monitoring value of the first to third PDs $202_1$ to $202_3$ by recognizing a multiplexing characteristic of the multiplexing unit 214 in advance.

Second Embodiment

As described above, the degradation of the emission end surfaces of LDs depends on the wavelengths, and the degree of degradation of LDs on the short wavelength side (B) is greater than that of LDs on the long wavelength side (R). According to the first example of the first embodiment, the first to third PDs $202_1$ to $202_3$ can respectively monitor light of the respective colors of R, G, and B. Thus, even if the degrees of degradation of LDs of respective colors are different from each other, a white balance can be adjusted with high accuracy since feedback control can be performed individually.

However, in a case where the degree of degradation of LDs is out of a range for feedback control, accurate white balance adjustment cannot be made. Thus, in the second embodiment, a plurality of LDs of the same color is prepared, and a degraded LD is switched to a backup LD. In this way, a configuration is employed in which individual accurate monitoring is possible even in actual operation of a light source. The present invention is not limited to an optical multiplexing circuit using an RGB coupler, and may be an optical multiplexing circuit that includes n LDs for each m set of wavelengths, i.e., a plurality of wavelengths, and can select one LD of the n LDs for each m set for multiplexing, and a light source with monitoring function.

First Example

Figure 5:
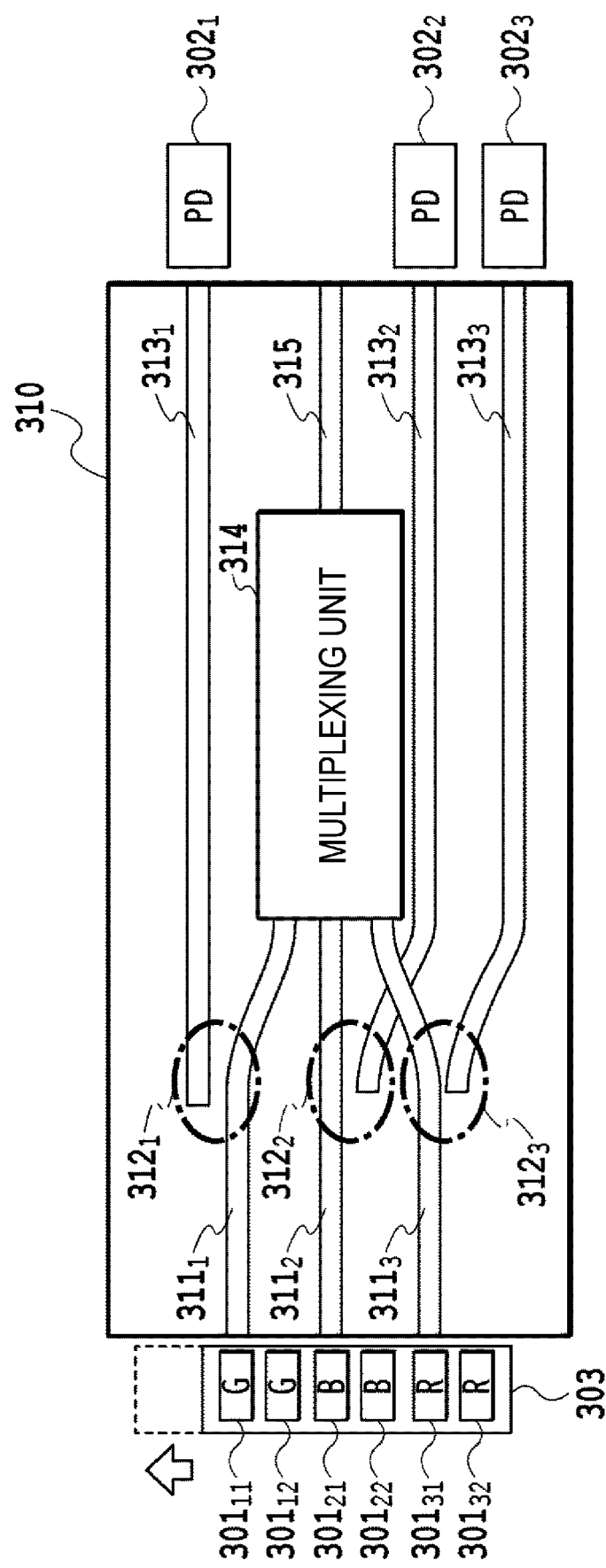
FIG. 5 is a diagram illustrating a light source with a monitoring function according to a first example of a second embodiment of the present invention.

FIG. 5 illustrates a light source with a monitoring function according to a first example of the second embodiment of the present invention. In the light source according to the first example, an RGB coupler 310 having the same configuration as the RGB coupler 210 of the first embodiment and a plurality of LD fixed to an LD mount 303 are optically coupled. On the LD mount 303, two (n=2) LDs for each color (m=3), i.e., LDs $301_{11}$ to $301_{31}$, being LDs for each color in an active system and LDs $301_{12}$ to $301_{32}$ being LDs for each color in a standby system. By changing the fixed position of the LD mount 303 relative to the RGB coupler 310, the LDs of the active system can be switched to the LDs of the standby system.

The first example illustrates an example in which LDs of respective colors are mounted on one substrate, and the three primary color LDs are simultaneously switched from the active system to the standby system. LDs may be mounted on different LD mounts for respective colors to switch the LDs of the active system to the LDs of the standby system for each color. As described above, the shorter the wavelength the severe the degradation of LDs, so only the LDs of the blue light B on the short wavelength side or only the LDs of the blue light B and the green light G may include LDs of the active system and the standby system.

In the first example, the LDs 301 of each color are fixed to the LD mount 303 and mechanically switched. Mechanical switching may increase a coupling loss between the LDs 301 and input waveguides 311. Thus, switching can be performed while active alignment is performed for each LD. Meanwhile, the work step increases in the active alignment, and thus the LDs 301 may be arranged so that a beam diameter is larger than a core diameter at the end surfaces of the input waveguides 311. Although the coupling loss before switching also increases, sensitivity due to misalignment associated with the switching of the LDs 301 is reduced, so there is less variation in the coupling loss due to mechanical switching.

Furthermore, although one standby system is implemented with respect to the active system (n=2) in the above description, a plurality of standby systems may be implemented (n>2). Of course, it is possible to configure not only an optical multiplexing circuit for three colors, three wavelengths, but also an optical multiplexing circuit for a plurality of wavelengths (m>2).

With such a configuration, a degraded LD can be easily switched to an unused LD. Thus, even when used in actual operation without sealing the LDs and the RGB coupler, it is possible to extend the life expectancy by the number of LDs mounted. Compared to the first example, the end surface of the RGB coupler facing the LD mount needs to be larger for alignment with the LD mount, but there is no change to the process of producing the RGB coupler, and there is no increase in manufacturing cost.

Second Example

Figure 6:
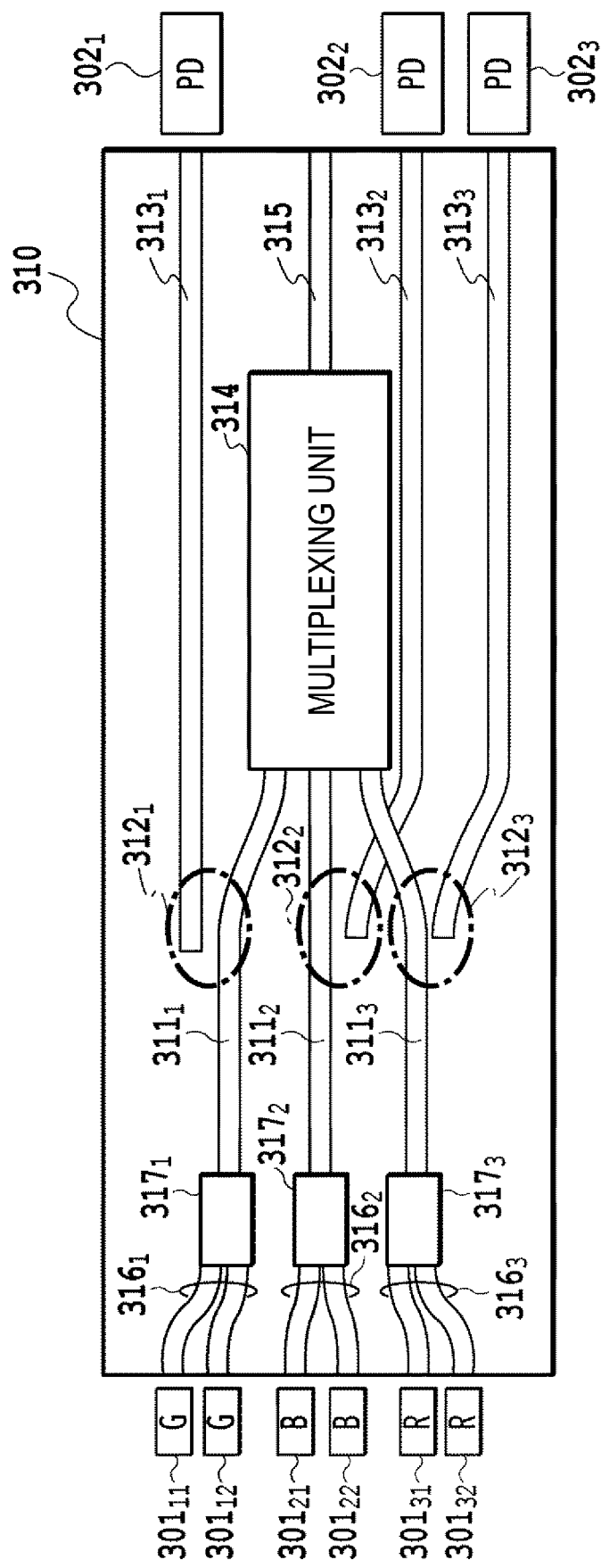
FIG. 6 is a diagram illustrating a light source with a monitoring function according to a second example of the second embodiment of the present invention.

FIG. 6 illustrates a light source with a monitoring function according to a second example of the second embodiment of the present invention. The light source with the monitoring function includes a plurality of LDs that output light of respective colors R, G, and B, a PLC-type RGB coupler 310, and first to third PDs $302_1$ to $302_3$ optically connected to the RGB coupler 310. The plurality of LDs include LDs $301_{11}$ to $301_{31}$, which are LDs for respective colors of the active system, and LDs $301_{12}$ to $301_{32}$, which are LDs for respective colors of the standby system (n=2, m=3). The RGB coupler 310 differs from the RGB coupler 310 of the first example in that multiplexers $317_1$ to $317_3$ and connection waveguides $316_1$ to $316_3$ for connecting the multiplexers and LDs are added to the first to third input waveguides $311_1$ to $311_3$, respectively.

The outputs of the LDs $301_{11}$ to $301_{31}$, which are LDs of respective colors of the active system, and the outputs of the LDs $301_{12}$ to $301_{32}$, which are LDs of respective colors of the standby system, are connected to a multiplexing unit 314 via the multiplexers $317_1$ to $317_3$ and the first to third branching units $312_1$ to $312_3$, respectively. One beam of the divided light is output to the first to third PDs $302_1$ to $302_3$ via the first to third monitoring waveguides $313_1$ to $313_3$, and the other beam of the divided light is multiplexed by the multiplexing unit 314 and output to the output waveguide 315.

In the second example, switching between the active system and the standby system is performed by electrically switching drive circuits of the LDs. Thus, there is no need to align between the LDs and the RGB coupler when switching between the active system and the standby system.

With such a configuration, a degraded LD can be easily switched to an unused LD. Thus, even when used in actual operation without sealing the LDs and the RGB coupler, it is possible to extend the life expectancy of LDs. Compared to the first example, the circuit size of the RGB coupler is larger, but because optical circuits are fabricated on the same wafer or chip, there is no increase in manufacturing cost and no additional components are needed because it can be made simultaneously in a single process.

Third Example

Figure 7:
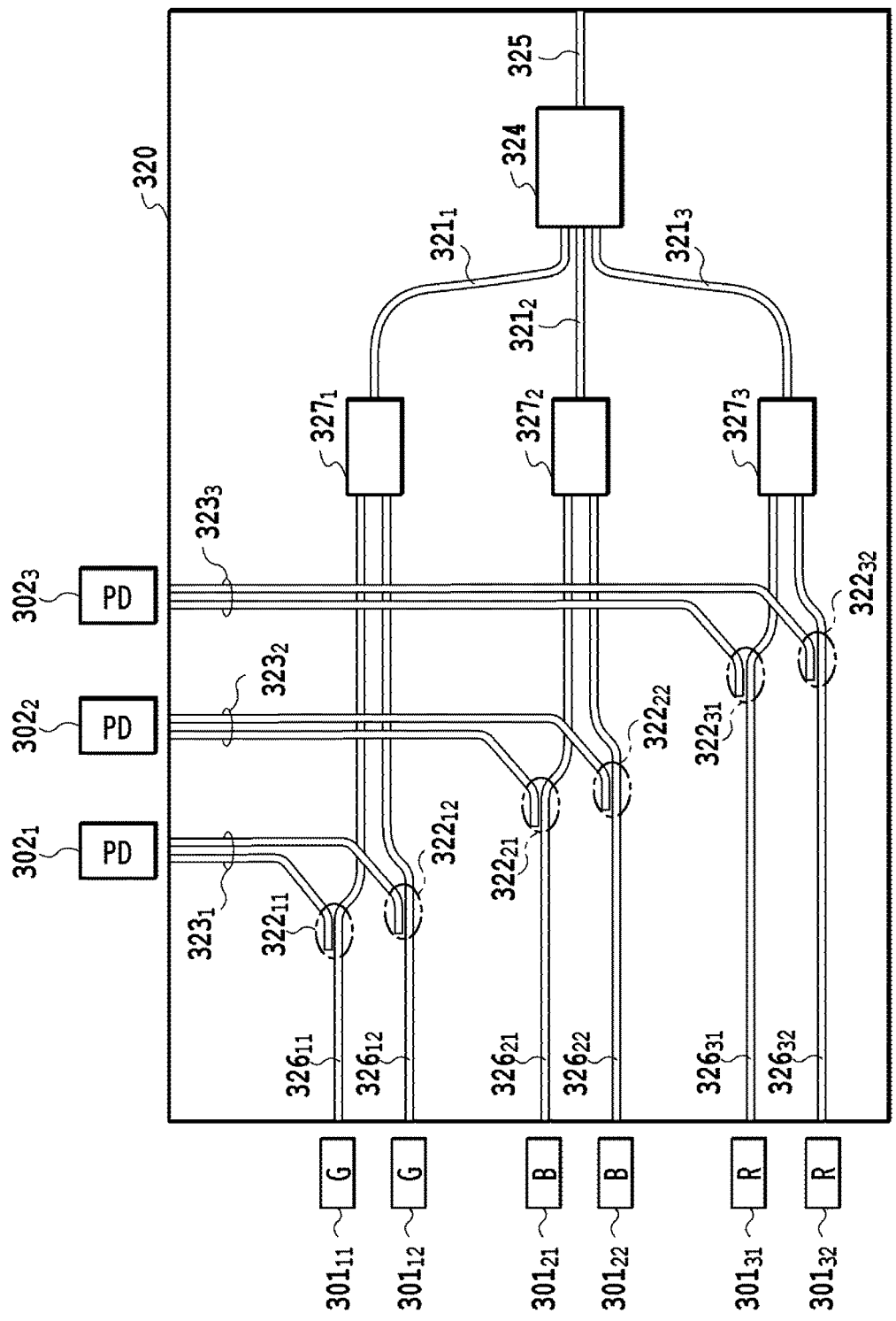
FIG. 7 is a diagram illustrating a light source with a monitoring function according to a third example of the second embodiment of the present invention.

FIG. 7 illustrates a light source with a monitoring function according to a third example of the second embodiment of the present invention. The configuration of the light source with the monitoring function is the same as the configuration in the second example, except for the circuit configuration of the RGB coupler 320 being different from the second example. The light source with the monitoring function includes a plurality of LDs that output light of respective colors R, G, and B, a PLC-type RGB coupler 320, and first to third PDs $302_1$ to $302_3$ optically connected to the RGB coupler 320. The plurality of LDs include LDs $301_{11}$ to $301_{31}$, which are LDs for respective colors of the active system, and LDs $301_{12}$ to $301_{32}$, which are LDs for respective colors of the standby system (n=2, m=3).

The PLC-type RGB coupler 320 includes connection waveguides $316_{11}$ to $316_{32}$ optically connected to a plurality of LDs, branching units $322_{11}$ to $322_{32}$ that divide light propagating in the connection waveguides into two, and multiplexers $327_1$ to $327_3$ that multiplex the outputs of the branching units $322_{11}$ to $322_{31}$ and the outputs of the branching units $322_{12}$ to $322_{32}$. The outputs of the multiplexers $327_1$ to $327_3$ are input to a multiplexer 324 via first to third input waveguides $211_1$ to $211_3$, respectively, and light multiplexed by the multiplexing unit 314 is output from an output waveguide 325.

In the third example, two outputs of the first to third monitoring waveguides 3231 to 3233 are output to first to third PDs $302_1$ to $302_3$. In a case where the effective light-receiving area in the light-receiving surface of each PD is wide, the light emitted from all of the two monitoring waveguides can also be received by the PDs by disposing the two monitoring waveguides at 5 to 20 µm intervals at the end surface of the RGB coupler 320. In other words, multiplexers that multiplex the outputs of the two monitoring waveguides may be omitted.

In the third example as well, switching between the active system and the standby system is performed by electrically switching drive circuits of the LDs. Thus, there is no need to align between the LDs and the RGB coupler when switching between the active system and the standby system.

With such a configuration, a degraded LD can be easily switched to an unused LD. Thus, even when used in actual operation without sealing the LDs and the RGB coupler, it is possible to extend the life expectancy of LDs. Compared to the first example, the circuit size of the RGB coupler is larger, but because optical circuits are fabricated on the same wafer or chip, there is no increase in manufacturing cost and no additional components are needed because it can be made simultaneously in a single process.

In the third example, the emission direction of the light from the LD 301 is configured to be generally perpendicular to the incident direction of the light at the PD 302, and thus it is possible to avoid stray light entering PD 302. Stray light is light that has leaked into the RGB coupler 310 without the output of the LD 301 being able to couple to the input waveguide 311, or the like.

Fourth Example

Figure 8:
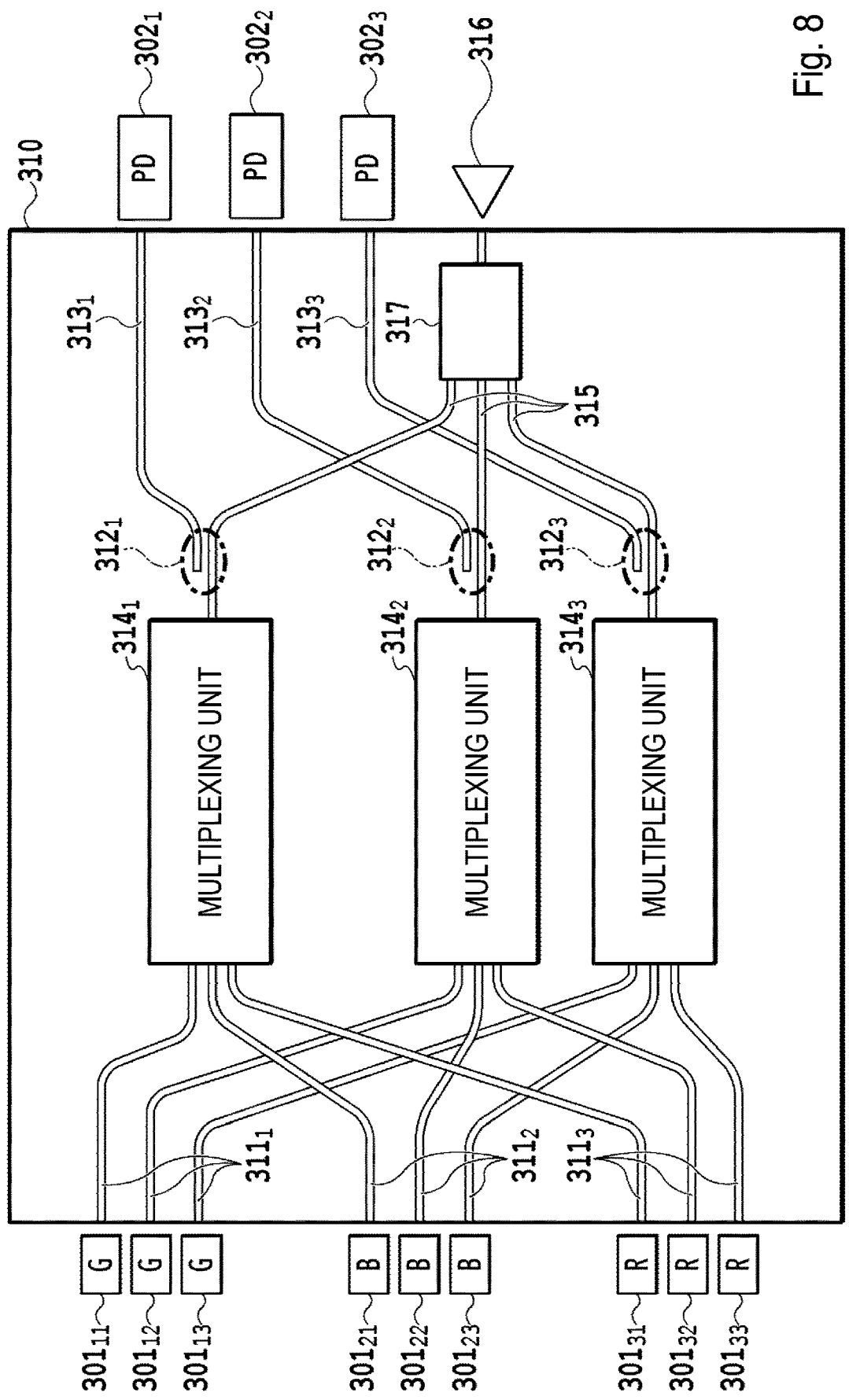
FIG. 8 is a diagram illustrating a light source with a monitoring function according to a fourth example of the second embodiment of the present invention.

FIG. 8 illustrates a light source with a monitoring function according to a fourth example of the second embodiment of the present invention. The light source of the fourth example differs in the connecting order of the branching units and the multiplexing units of the RGB coupler 310. This is a case where three LDs (n=3) are implemented for each color (m=3). The PLC-type RGB coupler 310 includes three input waveguides of first to third input waveguides $311_1$ to $311_3$ optically connected to the three LDs of first to third LDs $301_1$ to $301_3$, respectively, multiplexing units $314_1$ to $314_3$ that respectively multiplex light of the respective colors input to the first to third input waveguides $311_1$ to $311_3$, first to third branching units $312_1$ to $312_3$ that divide the outputs of the multiplexing units $314_1$ to $314_3$ into two, a multiplexer 317 that multiplexes beams each being one beam of the light divided by each of the first to third branching units $312_1$ to $312_3$, and first to third monitoring waveguides $313_1$ to $313_3$ that output the other beam of the light divided by each of the first to third branching units $312_1$ to $312_3$ to the first to third PDs $302_1$ to $302_3$.

In the fourth example, light in which light of the respective colors R, G, and B is multiplexed is output to the first to third monitoring waveguides $313_1$ to $313_3$. Thus, in a case where light of the respective colors of R, G, and B is monitored, it is necessary to use a wavelength filter or the like in a preceding stage of the first to third PDs $302_1$ to $302_3$ to separate.

Switching the LDs for each color is performed by electrically switching the drive circuits of the LDs. Thus, there is no need to align between the LDs and the RGB coupler at the time of switching.

Figure 9A:
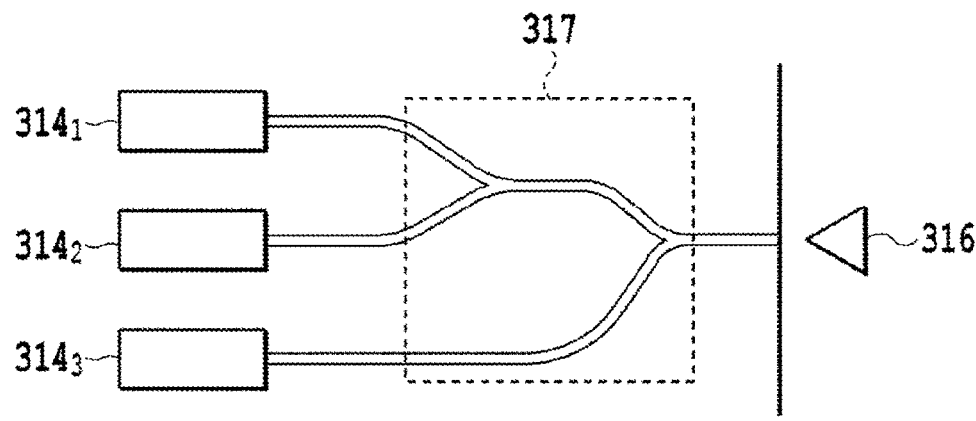
FIGS. 9(a)-9(c) are diagrams illustrating an example of a multiplexer according to the fourth example of the second embodiment.
Figure 9B:
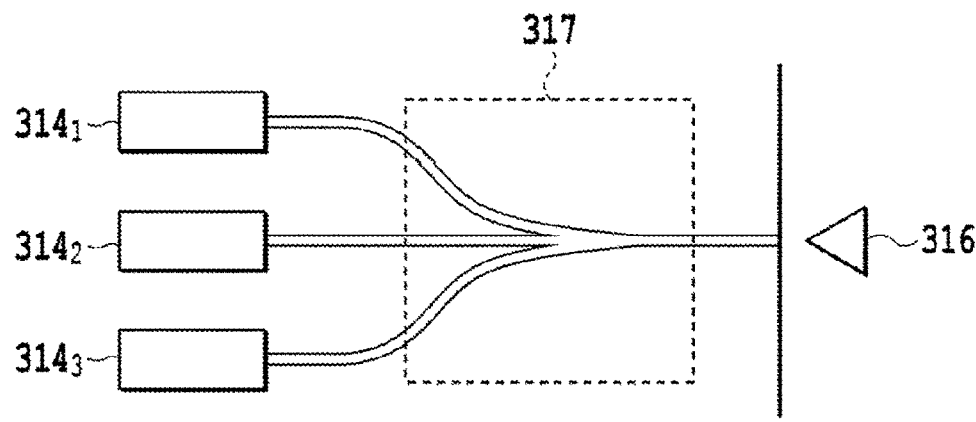
Figure 9C:
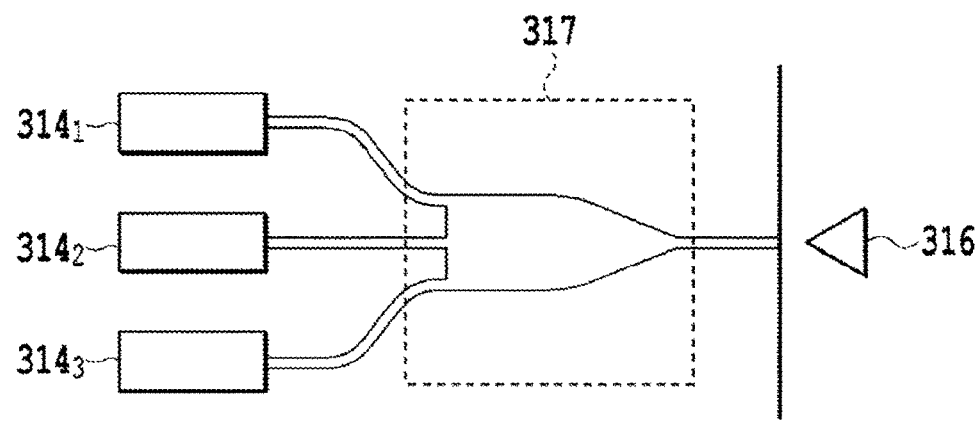

Furthermore, a single mode needs to be maintained in order to output light of each of colors of R, G, and B multiplexed by the multiplexing units $314_1$ to $314_3$ to the output port 316. Thus, an optical circuit in which Y branch circuits illustrated in FIG. 9(a) are connected in two stages, a three-branch circuit illustrated in FIG. 9(b), or an optical circuit combining a Multi-mode Interference (MMI) with a mode converter illustrated in FIG. 9(c) is applied to the multiplexer 317.

Note that, in the RGB coupler, the branching units for monitoring, the multiplexing units, and the multiplexer that multiplexes the outputs of the plurality of multiplexing units have various connection configurations as illustrated in the first to fourth examples, and the present invention is not limited to these examples.

Other Examples

In the third example, the emission direction of the light from the LD 301 is configured to be generally perpendicular to the incident direction of the light at the PD 302. In the first, second, and fourth examples as well, in a case where the output ends of the first to third monitoring waveguides $313_1$ to $313_3$ are disposed on the end surface of the side orthogonal to the side coupled to the LD 301, it is possible to avoid stray light from entering the PD 202 or 302. At this time, it is also possible to remove light that is not multiplexed by the multiplexing unit 314 or stray light that has leaked out therefrom or stray light that has leaked out to the interior of the RGB coupler 310 via a disposal port of the multiplexing unit 314.

REFERENCE SIGNS LIST 1 to 3, 21 to 23, 201, 301 LD
4 to 6 Lens
7 to 9 Half mirror
10 to 12 Dichroic mirror 13 to 15, 202, 302 Photodiode (PD)
16 MEMS
17 Screen
30, 100, 210, 310, 320A, 320B RGB coupler
31 to 33 Waveguide
34, 35 Multiplexer
101 to 103, 211, 311, 321 Input waveguide
104, 105 Directional coupler
106, 215, 315, 325 Output waveguide
212, 312, 322 Branching unit
313, 323 Monitoring waveguide
316, 326 Connection waveguide
317, 327 Multiplexing unit

The invention claimed is:

1. A light source with a monitoring function, comprising:
m sets of multiplexers configured to multiplex light output from n connection waveguides being a plurality of connection waveguides,
a multiplexing unit configured to input and multiplex light output from the m sets of the multiplexers from m input waveguides,
an output waveguide configured to output light multiplexed by the multiplexing unit,
n×m or m branching units being inserted into n×m connection waveguides of the plurality of connection waveguides or the m input waveguides,
n×m laser diodes each optically coupled to a corresponding one of the connection waveguides, the n×m laser diodes being mounted to a laser diode mount that is separte from a substrate that mounts the m sets of multiplexers, the n connection waveguides, the output waveguide, and the n×m or m branching units,
wherein a first one of the n×m laser diodes is configured as an active laser diode and a second one of the n×m laser diodes is configured as a standby laser diode, the monitoring function configured to:
detect a degradation in an operation of the first one of the n×m laser diodes, and
in response, switch to the operation of the second one of the n×m laser diodes by moving the laser diode mount such that a fixed position occupied by the first one of the n×m laser diodes before the laser diode mount is moved is occupied by the second one of the n×m laser diodes after the laser diode mount is moved.

2. The light source with a monitoring function of claim 1, further comprising:
a plurality of photodiodes each optically coupled to a corresponding one of a plurality of monitoring waveguides each being configured to output light divided by the branching units, the plurality of photodiodes being configured to detect the degradation in the operation of the first one of the n×m laser diodes.

3. The light source with a monitoring function according to claim 2, wherein a light emission direction from the n×m laser diodes is configured to be generally perpendicular to an incident direction of light at the plurality of photodiodes.

4. The light source with a monitoring function according to claim 2, wherein the n×m laser diodes are three sets (m=3) of laser diodes that output light of three primary colors of red light (R), green light (G), and blue light (B).

5. The light source with a monitoring function according to claim 3, wherein the n×m laser diodes are three sets (m=3) of laser diodes that output light of three primary colors of red light (R), green light (G), and blue light (B).

* * * * *